(No Model.)
C. W. WEISS.
DEVICE FOR COOLING LIQUIDS.
No. 458,607. Patented Sept. 1, 1891.
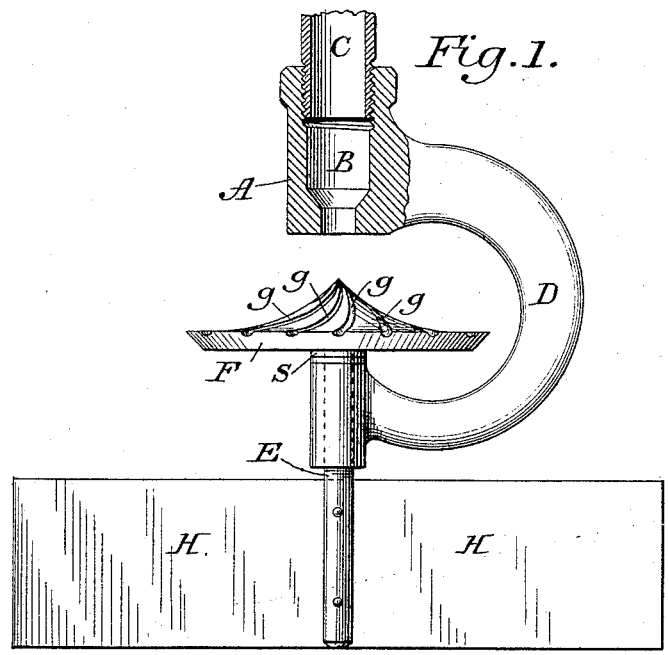
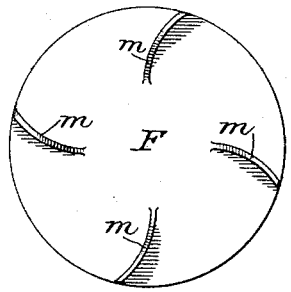
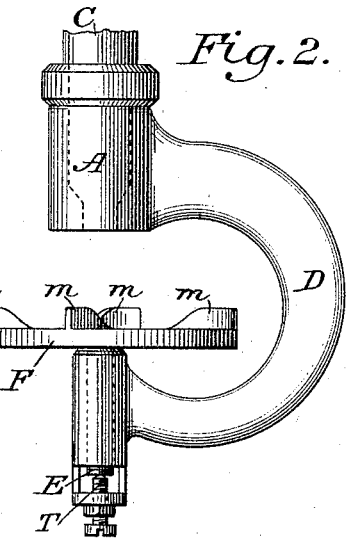
Attest:
A. N. Jesbera
E. M. Watson
Inventor:
Carl W. Weiss
By David A. Burr
Atty.

UNITED STATES PATENT OFFICE.

CARL W. WEISS, OF BROOKLYN, NEW YORK.

DEVICE FOR COOLING LIQUIDS.

SPECIFICATION forming part of Letters Patent No. 458,607, dated September 1, 1891.

Application filed January 26, 1891. Serial No. 379,032. (No model.)

*To all whom it may concern:*

Be it known that I, CARL W. WEISS, of Brooklyn, in the county of Kings and State of New York, have invented certain new and useful Improvements in Devices for Cooling Liquids; and I do hereby declare that the following is a full and exact description thereof, reference being had to the accompanying drawings, and to the letters of reference marked thereon, making a part of this specification.

My invention relates to devices for cooling liquids, and more especially for cooling beer in the process of its manufacture.

It has for its object to produce a simple device which will not choke or clog in operation by reason of particles in the liquid, and will effectually cool and oxygenate the liquid by exposing the same in a thin film to the action of the air.

It consists in the combination, with an orifice or nozzle for the discharge of the liquid to be cooled, and with an opposite revoluble disk, having radial curved grooves or vanes upon its upper face, and upon the center of which the column of liquid discharged from the nozzle is made to fall and be thereby diverted and spread in all directions in a thin circular sheet, exposing fully the atoms therein to the air, of a fan attached to the axial spindle, on which the disk is mounted to be revolved therewith, and operate to agitate the air, and thereby rapidly cool and aerate the discharging liquid.

In the accompanying drawings, Figure 1 is a side elevation, partly in section, of my device for cooling liquids; Fig. 2, a similar view of a modification thereof, and Fig. 3 a plan view of the revoluble deflecting-disk shown in Fig. 2.

A is a head having an aperture B pierced through it. The upper end of this aperture is threaded to receive a pipe C, leading to a tank or reservoir for the liquid. Its lower end is contracted in diameter, so as to concentrate the effluent stream of liquid from the pipe into a small compact jet.

The head A is formed or fitted with a bracket D, substantially semicircular in form, whose lower end is brought to a point immediately below the contracted nozzle of the head, and said lower end is extended in a right line with the aperture B in the head, and perforated to form a bearing for a rotating spindle E.

A disk F is fitted upon the spindle E to revolve freely therewith. The upper face of the disk is preferably made conical in form, with a series of radial curved grooves *g g* cut therein, to extend from its central apex to its periphery, as shown in Fig. 1. It may, however, be flattened on its upper surface and provided with a series of curved radial blades *m m* to project upwardly therefrom and extend from the circumference inwardly about midway to the center, as shown in Fig. 3. The disk F rests upon the upper end of its bearing, and thus supports the axial spindle E, to the lower end of which radial fan-blades H H are attached to agitate the air in the revolution of the disk F.

An adjustment of the disk to and from the discharge-nozzle in the head may be made by means of washers S, interposed between the under side of the disk and the top of its bearing, or, as an equivalent, by means of a set-screw T working through a strap at the lower end of the bearing to bear centrally against the lower end of the spindle.

In the use of this simple apparatus the head A is screwed upon the vertical end of the feed-pipe C, so that the device remains suspended therefrom. The liquid to be cooled is then admitted to said pipe C, and flowing through it with a pressure due to its head, will issue from the contracted aperture or nozzle B, and will drop with a force due to that pressure upon the center of the disk F, and produce, by its reaction against the inclined radial surfaces of the grooves *g g*, or of the blades *m m* thereon, a revolution thereof. As the disk revolves, it will diffuse the liquid in a thin sheet, which, by the resistance of the disk and its vanes, will be converted more or less into a spray. The fan carried by the disk not only assists in producing this resistance, but by its agitation of the air beneath the flying liquid atoms will oxygenate and cool the same. The measurably wide interval which may be left between the nozzle and the disk affords full and free way for the discharge of the particles of hops and other matters which, especially in the case of beer, operate to close and clog the coolers heretofore employed, and by an adjustment of the disk this interval may be readily increased or diminished in accordance with the character of the liquid to be cooled.

I claim as my invention—

The combination, in a device for cooling liquids, with a bracket having one end formed as a contracted discharge-nozzle and having the other end extended in a right line with said nozzle and perforated to form a lateral bearing, of a spindle extended through said bearing and held to rotate freely therein, a disk having upon its face a series of inclined radial guides and secured to said spindle and resting against the upper end of said bearing, and a fan secured to said spindle below the bearing, substantially as shown and described.

In testimony whereof I have signed my name to this specification in the presence of two subscribing witnesses.

CARL W. WEISS.

Witnesses:
 A. N. JESBERA,
 E. M. WATSON.